(12) United States Patent
Takamatsu et al.

(10) Patent No.: US 7,683,571 B2
(45) Date of Patent: Mar. 23, 2010

(54) ELECTRONIC DEVICE, METHOD FOR CONTROLLING THE SAME, AND PROGRAM FOR THE SAME

(75) Inventors: Seiji Takamatsu, Kitakyushu (JP); Hidetoshi Masuda, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 265 days.

(21) Appl. No.: 11/685,627

(22) Filed: Mar. 13, 2007

(65) Prior Publication Data

US 2007/0214296 A1    Sep. 13, 2007

(30) Foreign Application Priority Data

Mar. 13, 2006  (JP)  .............. 2006-067129
Nov. 17, 2006  (JP)  .............. 2006-311423

(51) Int. Cl.
  *H02J 7/00*  (2006.01)
(52) U.S. Cl. .................................. 320/106
(58) Field of Classification Search ............. 320/106; 726/34, 36
  See application file for complete search history.

(56) References Cited

U.S. PATENT DOCUMENTS

| | | | | |
|---|---|---|---|---|
| 7,439,707 | B2 * | 10/2008 | Shigeeda ............ | 320/106 |
| 7,506,183 | B2 * | 3/2009 | Araya ............... | 713/300 |
| 2003/0102842 | A1 * | 6/2003 | Tamai et al. ......... | 320/106 |
| 2006/0108972 | A1 * | 5/2006 | Araya ............... | 320/106 |

FOREIGN PATENT DOCUMENTS

| | | |
|---|---|---|
| JP | 10-235957 | 2/1997 |
| JP | 2004-259571 | 9/2004 |
| JP | 2004-289995 | 10/2004 |
| JP | 2005-249582 | 9/2005 |
| JP | 2005-285567 | 10/2005 |
| JP | 2005-345802 | 12/2005 |

OTHER PUBLICATIONS

Machine Translation for JP2005285567.*

* cited by examiner

*Primary Examiner*—Edward Tso
*Assistant Examiner*—Ramy Ramadan
(74) *Attorney, Agent, or Firm*—Workman Nydegger (57) ABSTRACT

The invention provides an electronic device having a structure operable by the power of a battery pack. The electronic device includes: an authenticating section that authenticates a battery pack connected so as to supply power to determine whether the battery pack is a genuine product; a user interface; and a controller for controlling the electronic device. The controller tries authentication of the battery pack connected so as to supply power with the authentication section. When the battery pack has been authenticated, the discharging of the battery pack is enabled. When the battery pack has not been authenticated, the controller requests the user to input recognition whether the battery pack is a genuine product through the user interface, and changes the control for the battery pack between when the user inputs, in response to the request, the recognition that the battery pack is a genuine product and when the user inputs the recognition that the battery pack is not a genuine product.

14 Claims, 8 Drawing Sheets

ELECTRONIC DEVICE, METHOD FOR CONTROLLING THE SAME, AND PROGRAM FOR THE SAME

BACKGROUND

1. Technical Field

The present invention relates to an electronic device having a structure operable with a battery pack such as a lithium-ion battery pack, a method for the same, and a program for the same.

2. Related Art

Known electronic devices having a structure operable with a battery pack such as a lithium-ion battery pack include digital cameras and video camcorders, and in recent years, portable printers operable with a battery pack (e.g., refer to Japanese Unexamined Patent Application Publication No. 10-235957. Such electronic devices operable with a battery pack recently have the problem of an accident such as the rupture of the battery pack which may be caused by the use of a copy or imitation. Here the copy or imitation is an illegal battery pack that imitates a genuine product, not including third-party battery packs. Genuine battery packs such as genuine lithium-ion battery packs accommodates a protection mechanism such as a fuse or a safety circuit and a control circuit that conform to a specified quality standard to prevent danger, thus having a superior level of safety. However, such copy or imitation battery packs often have poor quality without a protection mechanism such as a safety circuit and a control circuit. Accordingly, the use of such copies or imitations can cause not only abnormality of electronic devices but also abnormal heat generation, ignition, or rupture due to overcharge or the like.

Since such inferior copy or imitation battery packs are sold in the market as if they were genuine products, users who are going to buy a genuine battery pack often buy a copy or imitation by mistake. It is difficult for users who are going to buy a battery pack to distinguish a genuine product from copies or imitations just equivalent to genuine products in appearance. Moreover, it is not easy to completely prevent such inferior copy or imitation battery packs from circulating in the market. Accordingly, accidents such as the rupture of battery packs that seems to be caused by copy or imitation battery packs have often happened.

SUMMARY

An advantage of some aspects of the invention is to determine the quality of a battery pack that is used to operate an electronic device and to execute control for the battery pack according to the quality.

The invention adopts the following means to offer the above-described advantage.

According to a first aspect of the invention, there is provided an electronic device having a structure operable by the power of a battery pack. The electronic device includes: an authenticating section that authenticates a battery pack connected so as to supply power to determine whether the battery pack is a genuine product; a user interface; and a controller for controlling the electronic device. The controller tries authentication of the battery pack connected so as to supply power with the authentication section, wherein when the battery pack has been authenticated, the discharging of the battery pack is enabled, and when the battery pack has not been authenticated, the controller requests the user to input recognition whether the battery pack is a genuine product through the user interface, and changes the control for the battery pack between when the user inputs, in response to the request, the recognition that the battery pack is a genuine product and when the user inputs the recognition that the battery pack is not a genuine product.

The electronic device tries authentication of a battery pack connected so as to supply power, and when the battery pack has been authenticated, it regards it as a normal genuine product, and enables the discharging of the battery pack. On the other the hand, when the battery pack has not been authenticated, it means that the battery pack is not at least a normal genuine product. However, further discrimination is impossible. Therefore, the electronic device requests the user to input recognition whether the battery pack is a genuine product. When the user recognizes that the battery pack is a genuine product, there is a high possibility that the battery pack is an abnormal genuine product or an inferior nongenuine product (copy or imitation) that imitates a genuine product, so that control for such battery packs is performed. On the other hand, when the user recognizes that the battery pack is not a genuine product, there is a high possibility that the battery pack is a nongenuine product based on a genuine product (e.g., a battery pack made by a third party) because it does not imitate a genuine product, so that control for such battery packs is performed. Thus, the electronic device operable by a battery pack classifies the battery pack into a normal genuine product, an abnormal genuine product and an inferior nongenuine product that imitates a genuine product, and a nongenuine product based on a genuine product, and executes control according to classification. Thus, the electronic device can appropriately determine the quality of the battery pack and execute battery-pack control according to the quality. The user interface may be configured to output information to the user or input an instruction from the user.

In the electronic device according to the first aspect of the invention, in response to the request, when the user inputs the recognition that the battery pack is a genuine product, the controller may disable the discharging of the battery pack, and when the user inputs the recognition that the battery pack is not a genuine product, the controller may enable the discharging of the battery pack. In the former case, there is a high possibility that the battery pack is an abnormal genuine product or an inferior nongenuine product that imitates a genuine product. Therefore, to continue the operation of the electronic device using the battery pack has a safety problem. Thus, the discharging of the battery pack is disabled. In the latter case, since there is a high possibility that the battery pack is a nongenuine product based on a genuine product, the discharging of the battery pack is enabled. This allows appropriate battery pack control according to whether the battery pack is an abnormal genuine product, an inferior nongenuine product that imitates a genuine product, or a nongenuine product based on a genuine product. For the latter case, the discharging of the battery pack may either be enabled exactly in the same manner as for a genuine product or in a restricted manner in comparison with the genuine product.

In the electronic device according to the first aspect of the invention, preferably, when the user inputs, in response to the request, the recognition that the battery pack is a genuine product, the controller determines that the battery pack is out of order, and thus notifies the user of the fact through the user interface and disables the discharging of the battery pack as long as the battery pack is connected so as to supply power. Thus, a message that the battery pack is out of order is given to the user so as to warn the user to contact or ask the manufacturer of the genuine battery pack for repair. This may promote the repair or recycling of the failed genuine battery pack. Moreover, when the user mistakes the copy or imitation battery pack for a genuine product, the manufacturer of the genuine product can grasp the fact that the copy or imitation battery pack circulates in the market and get the copy or imitation battery pack in an early stage. The manufacture of the genuine product can use it to effectively prevent future copy or imitations, and quickly provide users with information on the presence and details of the copy or imitation battery pack to call attention.

In the electronic device according to the first aspect of the invention, preferably, when the user inputs, in response to the request, the recognition that the battery pack is not a genuine product, the controller enables the discharging and controls the user interface so that the amount of remaining power of the battery pack is displayed lower than that of a genuine product. That is, when the battery pack is a nongenuine product based on a genuine product like a third-party battery pack, its battery characteristic can be inferior to that of a genuine product. Therefore, the amount of remaining power of the nongenuine battery pack is not displayed with the same reference as that for a genuine product but lower than that for a genuine product. This configuration can reduce the possibility that a nongenuine product based on a genuine product becomes dead in a short time although it bears an indication that a sufficient amount of power remains.

In this case, preferably, when the user inputs, in response to the request, the recognition that the battery pack is not a genuine product, the controller manages the amount of remaining power of the battery pack and displays the amount of remaining power of the battery pack on the user interface while setting the threshold in estimating the amount of remaining power on the basis of output voltage higher than that of a genuine battery pack as long as the battery pack is connected so as to supply power. Thus, when the battery pack is a nongenuine product based on a genuine product and inferior to a genuine product in performance, this configuration can reduce the possibility of estimating the amount of remaining power of the battery pack more than the actual remaining amount.

According to a second aspect of the invention, there is provided an electronic device having a structure operable by the power of a battery pack or the power of an external power source other than the battery pack, the electronic device including: an authenticating section that authenticates a battery pack connected so as to supply power to determine whether the battery pack is a genuine product; a user interface; a charging circuit that can charge the battery pack with the power supplied from the external power source; and a controller for controlling the electronic device. The controller tries authentication of the battery pack connected so as to supply power with the authentication section, wherein when the battery pack has been authenticated, the charging and discharging of the battery pack are enabled, and when the battery pack has not been authenticated, the controller requests the user to input recognition whether the battery pack is a genuine product through the user interface, and change the control for the battery pack between when the user inputs, in response to the request, the recognition that the battery pack is a genuine product and when the user inputs the recognition that the battery pack is not a genuine product.

This electronic device tries authentication of the battery pack connected so as to supply power, and when the battery pack has been authenticated, it regards it as a normal genuine product and enables the charging and the discharging of the battery pack. On the other hand, when the battery pack has not been authenticated, it means that the battery pack is not at least a normal genuine product. However, further discrimination is impossible. Therefore, the electronic device requests the user to input recognition whether the battery pack is a genuine product. When the user recognizes that the battery pack is a genuine product, there is a high possibility that the battery pack is an abnormal genuine product or an inferior nongenuine product (copy or imitation) that imitates a genuine product, so that control for such battery packs is performed. On the other hand, when the user recognizes that the battery pack is not a genuine product, there is a high possibility that the battery pack is a nongenuine product based on a genuine product (e.g., a battery pack made by a third party) because it does not imitate a genuine product, so that control for such battery packs is performed. Thus, the electronic device operable by a battery pack classifies the battery pack into a normal genuine product, an abnormal genuine product and an inferior nongenuine product that imitates a genuine product, and a nongenuine product based on a genuine product, and executes control according to classification. Thus, the electronic device can appropriately determine the quality of the battery pack and execute battery-pack control according to the quality. The user interface may be configured to output information to the user or input an instruction from the user.

In the electronic device according to the second aspect of the invention, preferably, in response to the request, when the user inputs the recognition that the battery pack is a genuine product, the controller disables the charging and the discharging of the battery pack, and when the user inputs the recognition that the battery pack is not a genuine product, the controller enables the discharging and disables the charging. In the former case, there is a high possibility that the battery pack is an abnormal genuine product or an inferior nongenuine product that imitates a genuine product. Therefore, to continue operation of the electronic device using the battery pack has a safety problem. Thus, the charging and the discharging of the battery pack are disabled. In the latter case, since there is a high possibility that the battery pack is a nongenuine product based on a genuine product, the discharging of the battery pack may be enabled but the charging is disabled because charging a nongenuine battery pack may cause rupture. Thus appropriate battery pack control can be made according to whether the battery pack is an abnormal genuine product, an inferior nongenuine product that imitates a genuine product, or a nongenuine product based on a genuine product. For the latter case, the discharging may be enabled exactly in the same manner as for a genuine product or in a restricted manner in comparison with the genuine product. The restriction of charging includes disabling charging and enabling charging under conditions.

In the electronic device according to the second aspect of the invention, preferably, when the user inputs, in response to the request, the recognition that the battery pack is a genuine product, the controller determines that the battery pack is out of order, and thus notifies the user of the fact through the user interface, and disables the charging and the discharging of the battery pack as long as the battery pack is connected so as to supply power. This may promote the repair or recycling of the failed genuine battery pack. Moreover, when the user mistakes the copy or imitation battery pack for a genuine product, the manufacturer of the genuine product can grasp the fact that the copy or imitation battery pack circulates in the market and get the copy or imitation battery pack in an early stage. The manufacture of the genuine product can use it to effectively prevent future copy or imitations, and quickly provide users with information on the presence and details of the copy or imitation battery pack to call attention. In the electronic device according to the second aspect of the invention, preferably, when the user inputs, in response to the request, the recognition that the battery pack is not a genuine product, the controller disables only the charging of the battery pack and notifies the user of the fact as long as the battery pack is connected so as to supply power. That is, when the battery pack is a nongenuine product based on a genuine product like a third-party battery pack, the battery pack can be used to operate the electronic device but the charging of the battery pack which may cause rupture under abnormal condition is disabled when connected to the electronic device. This configuration can prevent an accident that may occur during charging by disabling charging while allowing the use of the power of a nongenuine battery pack based on a genuine product.

In the electronic device according to the second aspect of the invention, preferably, when the user inputs, in response to the request, the recognition that the battery pack is not a genuine product, the controller enables the discharging and controls the charging so that the battery pack is fully charged at a charge amount lower than that of a genuine product. That is, when the battery pack is a nongenuine product based on a genuine product like a third-party battery pack, the battery pack can be used to operate the electronic device. However, if fully charged with the same amount of power as that of a genuine product, the non genuine battery pack may be overcharged. Therefore, it is set so as to be fully charged with lower electricity than that for a genuine product. This allows the use of the power of a nongenuine battery pack based on a genuine product and also charging of the nongenuine battery pack in safety.

In this case, preferably, when the user inputs, in response to the request, the recognition that the battery pack is not a genuine product, the controller sets the full-charging voltage when controlling the charging of the battery pack lower than the full-charging voltage of a genuine product as long as the battery pack is connected so as to supply power. For a nongenuine battery pack based on a genuine product like a third-party battery pack, the full-charging voltage is set lower than that for a genuine product. This configuration can reduce the possibility of overcharging of a battery pack inferior in performance to a genuine battery pack.

In the electronic device according to the second aspect of the invention, preferably, when the user inputs, in response to the request, the recognition that the battery pack is not a genuine product, the controller enables the discharging and controls the user interface so that the amount of remaining power of the battery pack is displayed lower than that of a genuine product. That is, when the battery pack is a nongenuine product based on a genuine product, its battery characteristic can be inferior to that of a genuine product. Therefore, the amount of remaining power of the nongenuine battery pack is not displayed with the same reference as that for a genuine product but lower than that for a genuine product. This configuration can reduce the possibility that a nongenuine product based on a genuine product becomes dead in a short time although it bears an indication that a sufficient amount of power remains.

In this case, preferably, when the user inputs, in response to the request, the recognition that the battery pack is not a genuine product, the controller may manage the amount of remaining power of the battery pack and display the amount of remaining power of the battery pack on the user interface while setting the threshold in estimating the amount of remaining power on the basis of output voltage higher than that of a genuine battery pack. Thus, when the battery pack is a nongenuine product based on a genuine product and inferior to a genuine product in performance, this configuration can reduce the possibility of estimating the amount of remaining power of the battery pack more than the actual remaining amount.

In the electronic device according to the first or second aspect of the invention, preferably, when the power of the electronic device is turned on in a state in which the battery pack is connected so as to supply power and when it is detected that the battery pack is connected so as to supply power while the electronic device is at power-on, the controller may try authentication of the battery pack with the authenticating section. Thus, limiting the time to try authentication of a battery pack to the time when the electronic device is at power-on or when the battery pack is connected while the electronic device is at power-on, that is, limiting the time to try authentication of a battery pack only to the time when authentication of the battery pack is needed minimizes an increase in the process load on the controller which is caused by trying the authentication of the battery pack.

According to a third aspect of the invention, there is provided a method for controlling an electronic device by computer software, the electronic device having a user interface and operable by the power of a battery pack, the method including: (a) trying authentication of a battery pack connected so as to supply power to determine whether the battery pack is a genuine product; (b) enabling the discharging of the battery pack when the battery pack has been authenticated in step (a); and (c) when the battery pack has not been authenticated, requesting the user to input recognition whether the battery pack is a genuine product through the user interface and changing the control for the battery pack between when the user inputs, in response to the request, the recognition that the battery pack is a genuine product and when the user inputs the recognition that the battery pack is not a genuine product.

According to the method for controlling an electronic device, the electronic device tries authentication of a battery pack connected so as to supply power, and when the battery pack has been authenticated, it regards it as a normal genuine product, and enables the discharging and the charging of the battery pack. On the other the hand, when the battery pack has not been authenticated, the electronic device requests the user to input recognition whether the battery pack is a genuine product. When the user recognizes that the battery pack is a genuine product, there is a high possibility that the battery pack is an abnormal genuine product or an inferior nongenuine product (copy or imitation) that imitates a genuine product, so that control for such battery packs is performed. On the other hand, when the user recognizes that the battery pack is not a genuine product, there is a high possibility that the battery pack is a nongenuine product based on a genuine product (e.g., a battery pack made by a third party) because it does not imitate a genuine product, so that control for such battery packs is performed. Thus, in the method for controlling an electronic device operable by a battery pack, the battery pack is classified into a normal genuine product, an abnormal genuine product and an inferior nongenuine product that imitates a genuine product, and a nongenuine product based on a genuine product, and control according to classification is performed. Thus, the electronic device can appropriately determine the quality of the battery pack and execute battery-pack control according to the quality. The method for controlling an electronic device may further include a process for achieving any of the functions of the electronic device according to the first aspect of the invention.

BRIEF DESCRIPTION OF THE DRAWINGS

The invention will be described with reference to the accompanying drawings, wherein like numbers reference like elements.

FIG. 5 is a flowchart for a control procedure executed at power-on.

DESCRIPTION OF EXEMPLARY EMBODIMENTS

Figure 1:
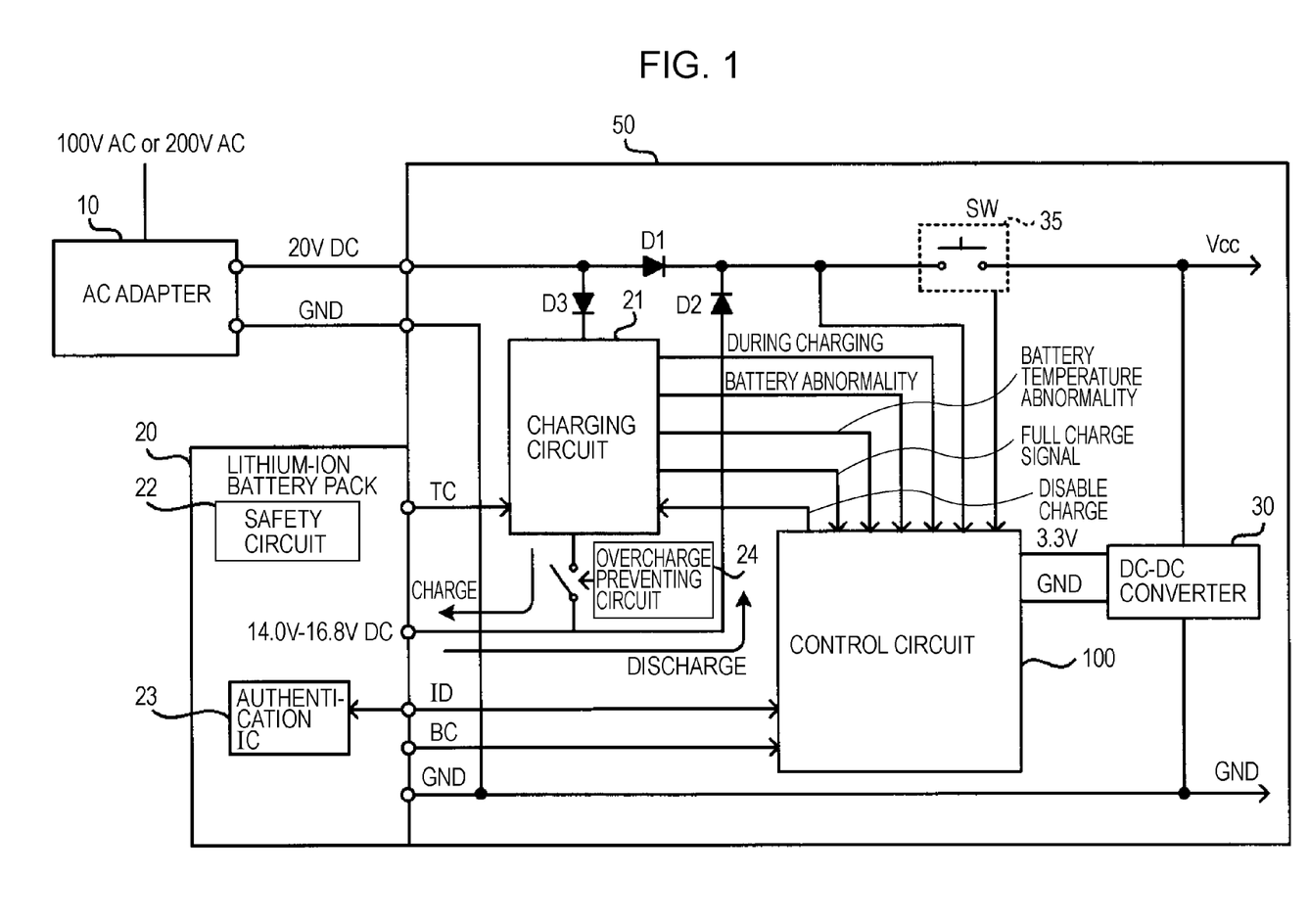
FIG. 1 is a power circuit diagram of an electronic device according to an embodiment of the invention.

The invention will be described in accordance with embodiments with reference to the drawings. FIG. 1 is a circuit diagram showing an example of the power system of an electronic device 50 according to an embodiment of the invention. A power line Vcc is supplied with power from an external AC adapter 10 serving as an external power supply and a detachable built-in lithium-ion battery pack 20 (hereinafter, a battery pack 20). The AC adapter 10 converts alternating-current power (100V AC or the like) to direct-current power (20V DC). The direct-current power output from the AC adapter 10 is supplied to the power line Vcc via a diode D1. The battery pack 20 accommodates a plurality of lithium-ion batteries (not shown), which outputs a direct-current power of approximately 16.8V in full charged state. The direct-current power output from the battery pack 20 is supplied to the power line Vcc via a diode D2. The power from the AC adapter 10 and the power from the battery pack 20 are ORed by the diode D1 and the diode D2 and supplied to the power line Vcc That is, the electronic device 50 according to an embodiment of the invention has a structure operable by power supplied from the battery pack 20 and the AC adapter 10. The power supplied to the power line Vcc is then supplied to a driving system such as a DC motor, and is converted to a control voltage (3.3V) by a DC-DC converter 30 and supplied to a control circuit 100 that controls the electronic device 50. The power line Vcc has a power switch 35, which connects or disconnects directly at the contact so as to turn on or off the power of the electronic device 50. The control circuit 100 can determine whether the battery pack 20 is mounted through a terminal BC of the battery pack 20. The maximum output voltage of the battery pack 20 is 16.8V DC, while the output voltage of the AC adapter 10 is 20V DC. Therefore, the control circuit 100 can determine the connection state of the AC adapter 10 and the output voltage of the battery pack 20 when the AC adapter 10 is out of connection from the voltage of the power line Vcc.

The electronic device 50 according to the embodiment has a charging circuit 21 that can charge the battery with the direct-current power supplied from the AC adapter 10 and an overcharge preventing circuit 24 for the battery pack 20. The charging circuit 21 charges the battery pack 20 in a specified charging sequence with a power of 20V DC supplied from the AC adapter 10 via a diode D3. During charging of the battery pack 20, the charging circuit 21 outputs a charging signal to the control circuit 100, and when the battery pack 20 has become full, outputs a full charge signal to the control circuit 100. Upon detection of battery abnormality or battery temperature abnormality from a terminal TC of the battery pack 20, the charging circuit 21 outputs a battery abnormality signal or a batter-temperature abnormality signal to the control circuit 100. While receiving a charge disable signal from the control circuit 100, the charging circuit 21 does not charge the battery pack 20 irrespective of the remaining amount of the battery pack 20. The overcharge preventing circuit 24 is provided to prevent overcharge in case where a nongenuine battery pack 20 without a safety circuit 22 is connected to execute charging.

The genuine battery pack 20 has the safety circuit 22 and an authentication IC 23 in addition to a plurality of lithium-ion batteries (not shown). The safety circuit 22 has a temperature fuse and a protection circuit (not shown) for preventing overcharge and overdischarge that meet a specified quality standard. The use of the safety circuit 22 prevents the genuine battery pack 20 from overcharging and overdischarging in the event of failure, providing extremely high security. The authentication IC 23 tries to authenticate the battery pack 20 to determine whether the battery pack 20 that is connected to the electronic device 50 so as to supply power is a genuine product. The battery pack 20 is authenticated when the key data of the authentication IC 23 which is installed only in the genuine battery pack 20 and the key data of the control circuit 100 of the electronic device 50 agree with each other.

The authentication IC 23, which is formed of a known authentication microprocessor chip, is capable of coded communication using a secure communication protocol, allowing authentication through coded communication with the control circuit 100 via a terminal ID of the battery pack 20. Accordingly, even if the communication between the battery pack 20 and the control circuit 100 is analyzed, the content of the key data can hardly be specified. The authentication IC 23 has high tamper resistance so as to prevent the internal key data from being read illegally by a third party. This substantially disables to specify the content of the authentication IC 23 such as key data even if the authentication IC 23 is analyzed physically or electrically. Therefore, it is practically impossible to copy the authentication IC 23 or key data and to incorporate it in a copy or imitate battery pack. This ensures that the battery pack 20 authenticated for the control circuit 100 is a genuine battery pack 20 almost without fail.

Figure 2:
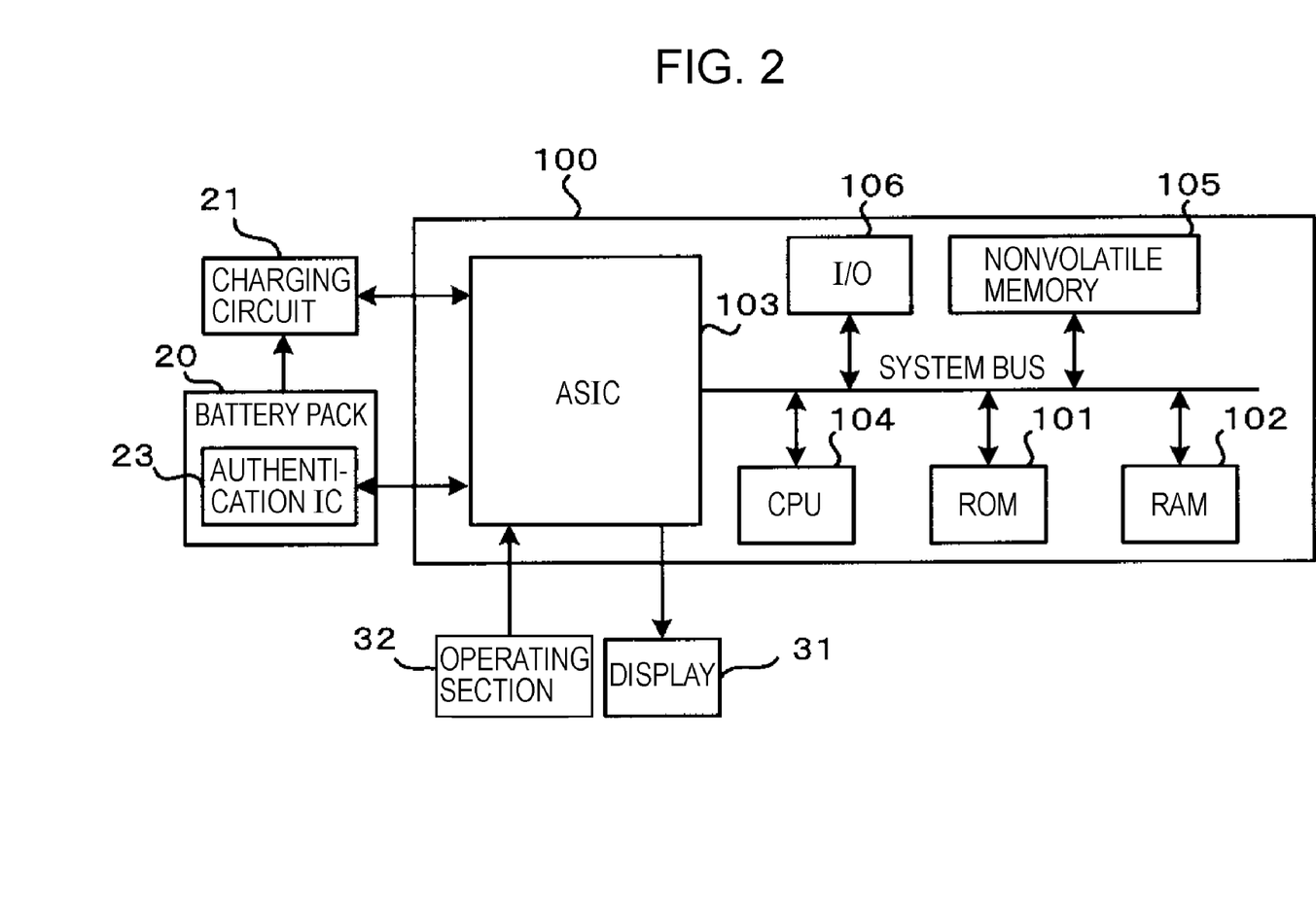
FIG. 2 is a block diagram of essential parts of a control circuit of the electronic device according to an embodiment of the invention.

FIG. 2 is a block diagram of essential parts of the control circuit 100. The system bus of the control circuit 100 connects to a ROM 101, a RAM 102, an application-specific integrated circuit (ASIC) 103, a CPU 104, and a nonvolatile memory 105. The CPU 104 performs a calculation for controlling the electronic device 50 and other necessary calculations. The ROM 101 stores an electronic-device control program (firmware) and so on necessary for controlling the electronic device 50 by the CPU 104. The nonvolatile memory 105 stores various data necessary for the process of the electronic-device control program. The RAM 102 is used as the operating area of the CPU 104 and a data storage area. An I/O 106 executes various control outputs (motor control etc.) for the electronic device 50 according to the calculations and inputs various information (sensor signals etc.) for the electronic device 50.

The ASIC 103 inputs battery-state information (during charging, full charge, battery abnormality, battery-temperature abnormality, etc.) from the charging circuit 21, and outputs control information (a charge enabling signal etc.) for the charging circuit 21 to the charging circuit 21. Furthermore, the ASIC 103 outputs a display signal to a display 31 such as a liquid-crystal display panel, and inputs a user operation at an operating section 32 such as an operation button. The ASIC 103 also performs coded communication with the authentication IC 23 incorporated in the electrically connected genuine battery pack 20 and authentication.

Figure 3A:
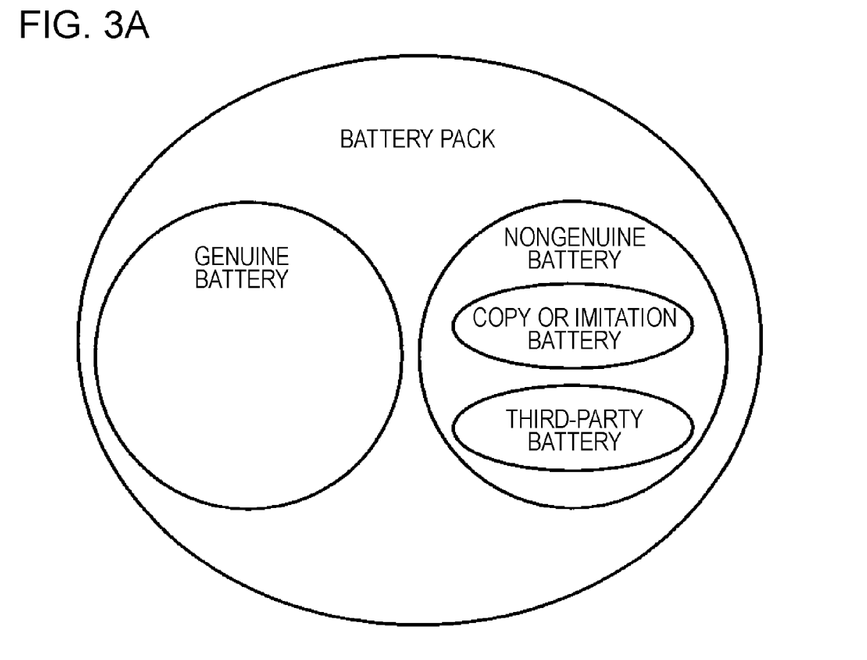
FIG. 3 is a diagram showing the outline of a battery pack.
Figure 3B:
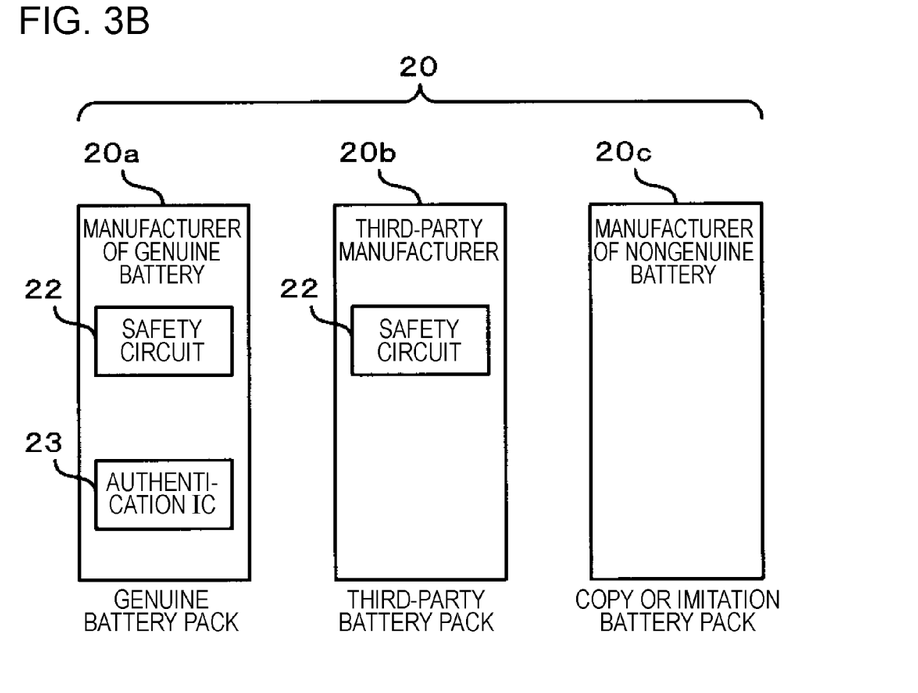

The difference among genuine, third-party, and copy or imitation battery packs 20 will be briefly described. FIG. 3 shows the outline of the genuine, third-party, and copy or imitation battery packs 20.

The battery pack 20 will be described hereinafter with a genuine battery pack denoted at 20a, a third-party battery pack denoted at 20b, and a copy or imitation battery pack denoted at 20c.

The battery pack 20 of the electronic device 50 according to the invention can be broadly classified into the genuine battery pack 20a, the third-party battery pack 20b, and the copy or imitation battery pack 20c according to a difference in manufacturer and structure. The genuine battery pack 20a is made by the manufacturer of the electronic device 50, and the others are nongenuine products. The nongenuine products can further be roughly classified into the third-party battery pack 20b made by a third-party manufacturer and the copy or imitation battery pack 20c made by an unknown manufacturer and imitating a genuine product.

The genuine battery pack 20a of the electronic device 50 has extremely high safety because it has the safety circuit 22, as described above. The third-party battery pack 20b is nearly the same in that respect. However, although the genuine battery pack 20a has the authentication IC 23, the third-party battery pack 20b has no authentication IC 23. Therefore, the third-party battery pack 20b is not authenticated even if it is connected to the electronic device 50. On the other hand, the inferior copy or imitation battery pack 20c that imitates a genuine battery pack by using a genuine manufacturer name has no safety circuit 22 and no authentication IC 23. Therefore, such inferior copy or imitation battery pack 20c may sometimes cause not only abnormality of the electronic device 50 but also heat generation, ignition, or rupture due to overcharge or the like. Moreover, the copy or imitation battery pack 20c is not authenticated if connected to the electronic device 50 because it has no authentication IC 23.

Here a procedure for controlling the electronic device 50 according to the electronic-device control program of the control circuit 100 will be described.

Figure 4:
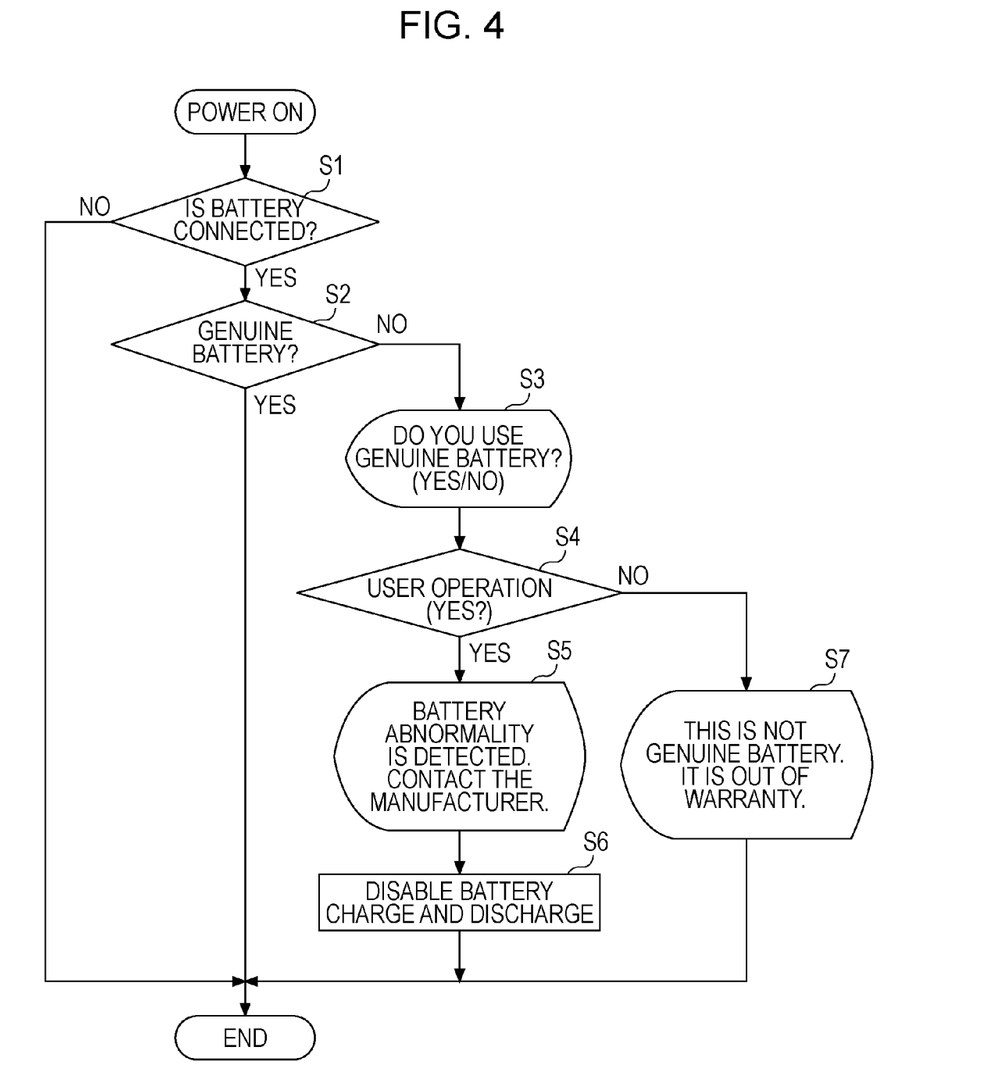
FIG. 4 is a flowchart for a control procedure at power-on according to a first embodiment.

FIG. 4 is a flowchart for a control procedure for the electronic device 50 according to a first embodiment which is executed at power-on. When the electronic device 50 is at power-on, first, it is determined whether the battery pack 20 (hereinafter, also referred to as a battery) is connected to the electronic device 50 so as to supply power thereto (step S1). This can be determined from the terminal BC (see FIG. 1) of the battery pack 20. When the battery pack 20 has not been connected to the electronic device 50 so as to supply power (No in step S1), the procedure is finished. On the other hand, when the battery pack 20 has been connected to the electronic device 50 so as to supply power (Yes in step S1), then authentication of the battery pack 20 is tried by the authentication IC 23 to determine whether the battery pack 20 is the genuine battery pack 20a (step S2).

When the battery pack 20 is successfully authenticated, the battery pack 20 can be determined to be the genuine battery pack 20a almost without fail (Yes in step S2). In this case, charge or discharge of the genuine battery pack 20a is enabled when the process is finished. Thus, the electronic device 50 can either be driven by the power of the genuine battery pack 20a or charge the genuine battery pack 20a with the power supplied from the AC adapter 10. On the other hand, when authentication of the battery pack 20 results in failure (No in step S2), the battery pack 20 can be determined not to be a normal genuine product but it cannot be determined whether it is a failed genuine battery pack 20a, the third-party battery pack 20b, or the inferior copy or imitation battery pack 20c that imitates a genuine product.

In this case, a message like "Do you use a genuine battery? (Yes/No)" is displayed on the display 31, thereby requesting the user to input "Yes" or "No" by operating the operating section 32 (step S3). When the user recognizes that the battery pack 20 connected to the electronic device 50 is a genuine product and thus inputs "Yes" with the operating section 32 (Yes in step S4), one of the followings applies. Specifically speaking, this indicates that the battery pack 20 connected to the electronic device 50 is either the genuine battery pack 20a which cannot be normally authenticated for some reason or the copy or imitation battery pack 20c that imitates a genuine product that the user mistakes for the genuine battery pack 20a.

In this case, even if the battery pack 20 connected to the electronic device 50 is either the failed genuine battery pack 20a or the copy or imitation battery pack 20c, to continue to operate the electronic device 50 using the battery pack 20 has a safety problem. Therefore, when the battery pack 20 has not been authenticated, the battery pack 20 connected to the electronic device 50 is uniformly determined to be broken, and a message like "Battery abnormality is detected. Contact the manufacturer" is displayed on the display 31 so as to notify the user of it (step S5).

Then the charging and discharging of the battery pack 20 are disabled (step S6) as long as the battery pack 20 is connected to the electronic device 50 so as to supply power. This disables using the battery pack 20 in the electronic device 50 and charging the electronic device 50, thus preventing rupture, abnormal heat generation, and fluid leaks of the inferior copy or imitation battery pack 20c and failure in the electronic device 50 which may be caused when the electronic device 50 is operated using the inferior copy or imitation battery pack 20c. Moreover, this allows the failure of the genuine battery pack 20a to be detected quickly. In addition to disabling charging and discharging, it is preferable to disable the operation of the electronic device 50 except power-off operation or to execute automatic power-off control of the electronic device 50 after a lapse of a specified time.

On the other hand, when the user recognizes that the battery pack 20 connected to the electronic device 50 is not a genuine product and thus inputs "No" with the operating section 32 (No in step S4), this indicates at least that the battery pack 20 is neither the genuine battery pack 20a nor the copy or imitation battery pack 20c that imitates a genuine product. As a result, the battery pack 20 is the third-party battery pack 20b. The third-party battery pack 20b can be slightly inferior in performance than the genuine battery pack 20a although most of third-party battery packs 20b has no problem in performance, quality, and safety. Therefore, application of a threshold based on the characteristics of the genuine battery pack 20a to the third-party battery pack 20b in managing the amount of remaining power may hinder a correct remaining power management.

Accordingly, if the third-party battery pack 20b is connected to the electronic device 50 (Yes in step S4), a message like "This is not a genuine battery. It is out of warranty." is displayed on the display 31 (step S7). The chargeable and dischargeable state of the electronic device 50 is continued as long as the third-party battery pack 20b is connected to the electronic device 50. However, the amount of remaining power of the third-party battery pack 20b is managed such that the threshold of the amount of remaining power estimated from output voltage is set higher than that for the genuine battery pack 20a, and the remaining amount is displayed on the display 31. This can prevent overestimation of the amount of remaining power of the third-party battery pack 20b, thus reducing the possibility that the battery pack 20b runs down in a short time even though an indication that there is a sufficient amount of remaining power is displayed on the screen of the display 31.

Furthermore, the third-party battery pack 20b can be slightly inferior in performance to the genuine battery pack 20a, as described above. Accordingly, if the third-party battery pack 20b is charged with the power supplied from the AC adapter 10 at full-charge voltage based on the characteristics of the genuine battery pack 20a indiscriminately, it may be overcharged when battery characteristics are different from each other. This may cause excessive load during charging to degrade the performance of the third-party battery pack 20b and to cause abnormal heat generation, and also cause rupture due to overcharge at worst.

Accordingly, when the third-party battery pack 20b is connected to the electronic device 50 (No in step S4), a full-charge voltage in executing charge control is set lower than the full-charge voltage of the genuine battery pack 20a as long as the third-party battery pack 20b is connected to the electronic device 50. Thus, if the third-party battery pack 20b is inferior in performance to the genuine battery pack 20a, the possibility of overcharge to the third-party battery pack 20b can be reduced. This reduces the possibility of degradation, abnormal heat generation, and rupture of the third-party battery pack 20b due to overcharge.

Figure 5:
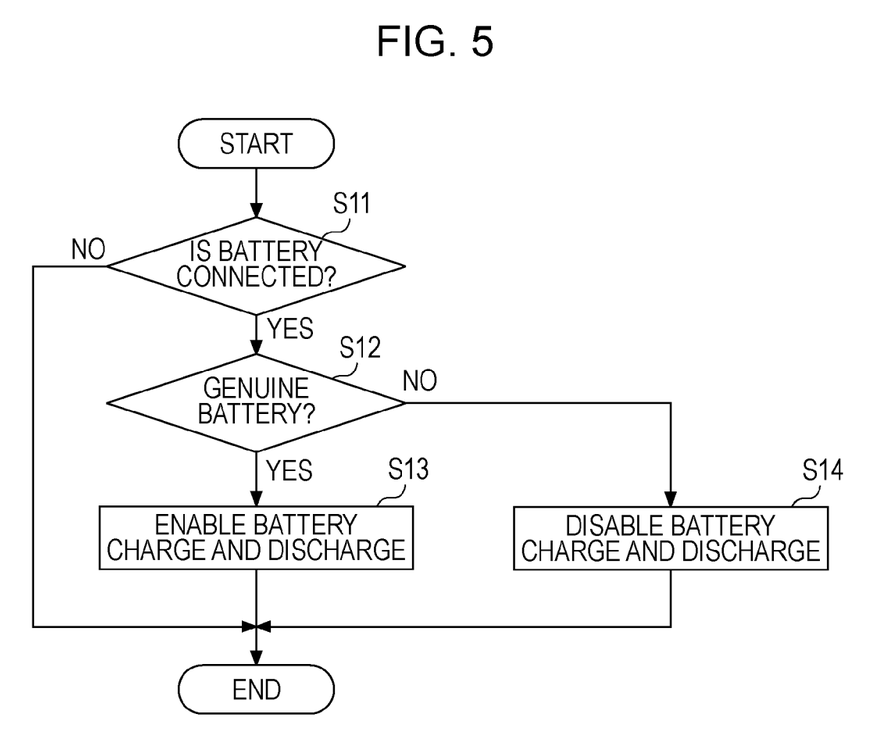

While the electronic device 50 is used during power-on, displaying the above-mentioned messages or requests (S3, S5 and S7 of FIG. 4) every time the battery pack 20 is replaced may reduce the operability and convenience of the electronic device 50, because the display 31 is used as part of the normal functions of the electronic device 50. Therefore, while the electronic device is used during power-on, authentication of the battery pack 20 is done only when the battery pack 20 is connected so as to supply power, and then only to determine whether the battery pack 20 is the genuine battery pack 20a. Such control procedure is illustrated in the flowchart of FIG. 5.

Specifically speaking, it is determined whether the battery pack 20 is connected (step S11) wherein when the battery pack 20 is connected (Yes in step S11) authentication of the battery pack 20 is tried to determine whether it is the genuine battery pack 20a (step S12). When the battery pack 20 is successfully authenticated, the battery pack 20 is determined to be the normal genuine battery pack 20a (Yes in step S12), the charging and discharging of the genuine battery pack 20a are enabled (step S13). On the other hand, when authentication has failed, the battery pack 20 is determined to be a battery pack 20 other than the normal genuine battery pack 20a (No in step S12). This implies that the connected battery pack 20 may be the copy or imitation battery pack 20c. Thus, the charging and discharging of the battery pack 20 are disabled for giving top priority to safety (step S14).

In the electronic device 50 according to the embodiment of the invention, the battery pack 20 is classified into a normal genuine battery pack, an abnormal genuine battery pack or an inferior nongenuine battery pack that imitates a genuine product, and a nongenuine battery pack based on a genuine product, to which appropriate charge control and discharge control are executed. Thus, the quality of the battery pack 20 can be determined appropriately and control for the battery pack 20 can be executed according to the quality. The invention can prevent possible abnormal heat generation and fluid leaks of the inferior copy or imitation battery pack 20c, or the failure of the electronic device 50 that may be caused by using the inferior copy or imitation battery pack 20c, and the rupture of the inferior copy or imitation battery pack 20c which may be caused when it is charged. Thus, the possibility of an accident of the electronic device 50 operable with the battery pack 20 caused by the use of the inferior copy or imitation battery pack 20c can be reduced.

For a battery pack 20 that has failed in authentication, a message that it is broken is given to the user via the display 31 to warn the user to contact or ask the manufacturer of the genuine battery pack to repair it. This may promote the repair or recycling of the broken genuine battery pack 20a. Moreover, when the user mistakes the copy or imitation battery pack 20c for the genuine battery pack 20a, the manufacturer of the genuine battery pack 20a can grasp the fact that the copy or imitation battery pack 20c circulates in the market and the chance to get the copy or imitation battery pack 20c in an early stage. The manufacturer of the genuine battery pack 20a can therefore put it to prevent future copy or imitation, and can quickly provide users with information on the presence and details of the copy or imitation battery pack 20c to call attention.

Figure 6:
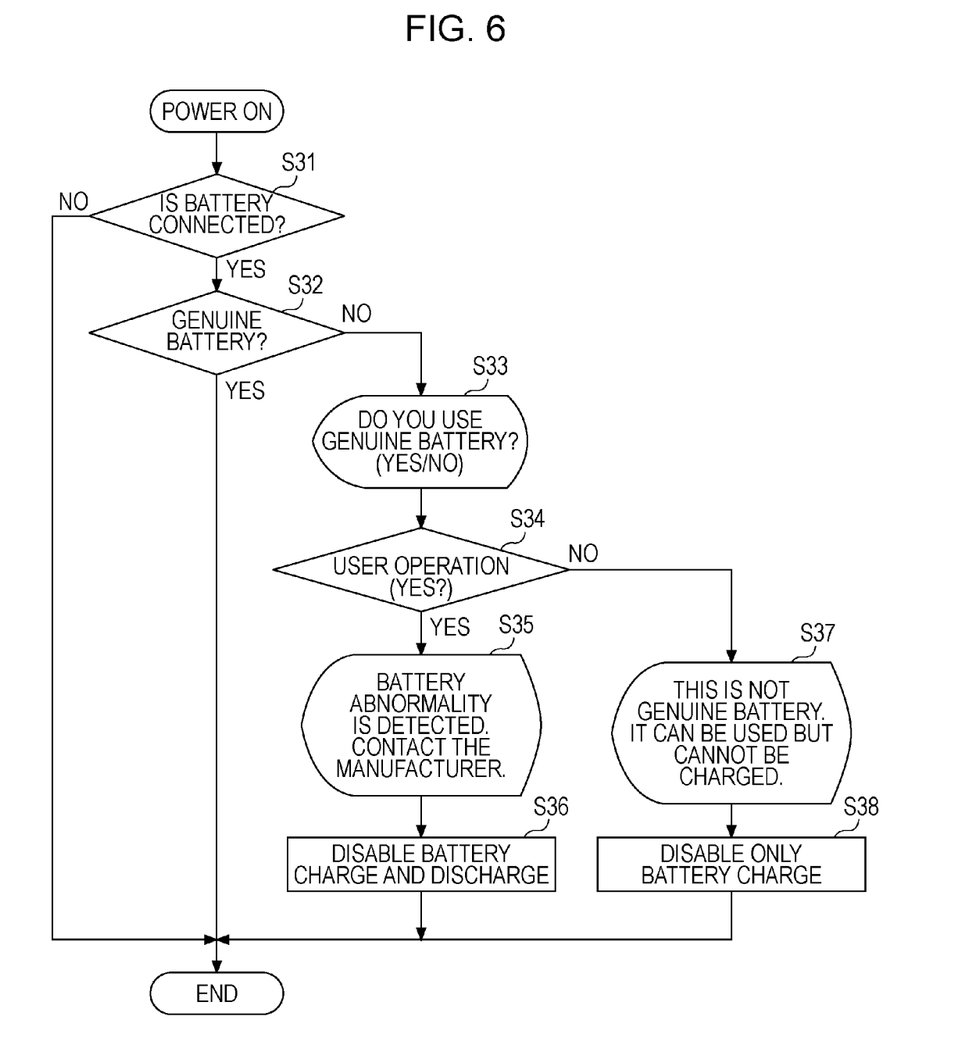
FIG. 6 is a flowchart for a control procedure at power-on according to a second embodiment.

FIG. 6 is a flowchart for a control procedure for the electronic device 50 according to a second embodiment which is executed at power-on. Descriptions of steps S31 to S36 of the flowchart will be omitted because they are the same as steps S1 to S6 of the flowchart for the first embodiment shown in FIG. 4.

In step S34, when the user recognizes that the battery pack 20 connected to the electronic device 50 is not a genuine product and thus inputs "No" with the operating section 32 (No in step S34), the battery pack 20 is the third-party battery pack 20b. Although most of the third-party battery packs 20b have no problem in performance, quality, and safety, there is no guarantee that all of them have no problem in performance, quality, and safety because third-party manufacturers manufacture and sell the third-party battery pack 20b with independent design and quality control criteria.

Accordingly, when the third-party battery pack 20b is connected to the electronic device 50 (No in step S34), a message like "This is not a genuine battery. It can be used but cannot be charged" is displayed on the display 31 (step S37). Then only the charging of the third-party battery pack 20b is disabled (step S38) as long as the third-party battery pack 20b is connected to the electronic device 50. In other words, although the third-party battery pack 20b can be used continuously to operate the electronic device 50, it cannot charge the electronic device 50 in connection thereto. Thus, the third-party battery pack 20b which is out of guaranty of the manufacturer of the genuine product can be prevented from being ruptured during charging because of some abnormality by disabling the charge of the electronic device 50 by the charging circuit 21 while providing the electronic device 50 in which the third-party battery pack 20b can be used.

Figure 7A:
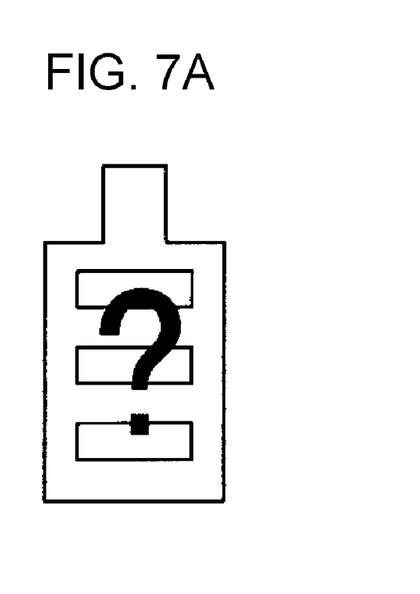
FIG. 7A is a diagram of an icon of a battery pack displayed on a display.

FIGS. 7A to 7D show examples of the icon of the battery pack 20 displayed on the display 31. FIG. 7A shows an icon in the case where the electronic device 50 is operating by the power from the AC adapter 10, and the charging and discharging of the battery pack 20 are disabled. Since not only charging of the battery pack 20 but also discharging from the battery pack 20 are disabled, the power of the electronic device 50 is shut down (power off) automatically. This icon is displayed, for example, when the battery pack 20 is the copy or imitation battery pack 20c and the power is turned on in a state in which both the AC adapter 10 and the battery pack 20 are connected to the electronic device 50 so as to provide power to the electronic device 50 or, alternatively, when it is a battery pack (the third-party battery pack 20b or the copy or imitation battery pack 20c) other than the genuine battery pack 20a that is connected to the electronic device 50 when the battery pack 20 is connected or replaced while the electronic device 50 is operating by the power from the AC adapter 10.

Figure 7B:
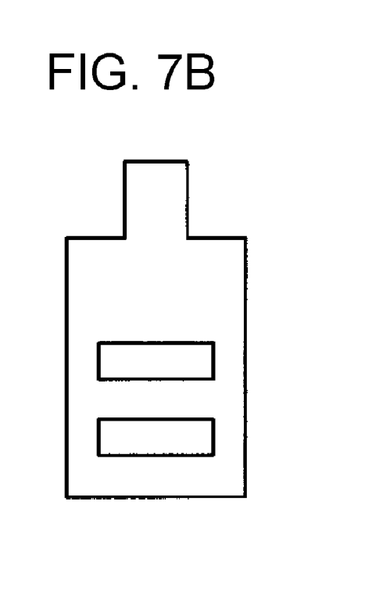
FIG. 7B is a diagram of an icon of a battery pack displayed on a display.

FIG. 7B shows an icon in the case where the electronic device 50 is operating by the power from the battery pack 20. For example, it is the case where the battery pack 20 is the genuine battery pack 20a or the third-party battery pack 20b when the power of the electronic device 50 is turned on in a state in which only the battery pack 20 is connected to the electronic device 50 so as to provide power or, alternatively, when charging to the third-party battery pack 20b is disabled (second embodiment), the third-party battery pack 20b is not charged even if both to the AC adapter 10 and the third-party battery pack 20b are connected, so that the same icon is displayed.

Figure 7C:
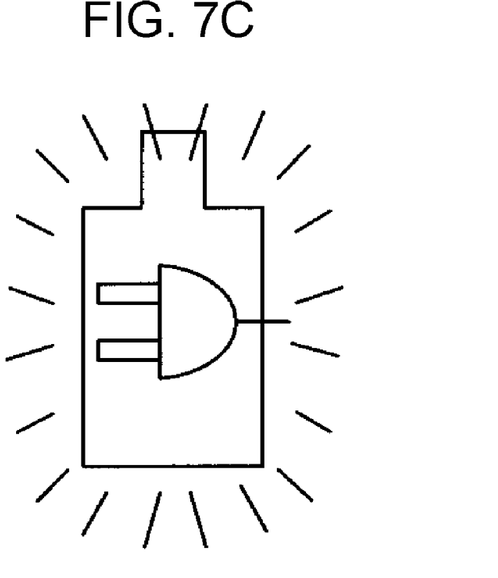
FIG. 7C is a diagram of an icon of a battery pack displayed on a display.

FIG. 7C shows an icon that flashes while the electronic device 50 is operated by the power from the AC adapter 10 and the battery pack 20 is charged. For example, this is an icon in the case where the genuine battery pack 20a is connected together with the AC adapter 10 and is charged or the third-party battery pack 20b is connected and charged (first embodiment).

Figure 7D:
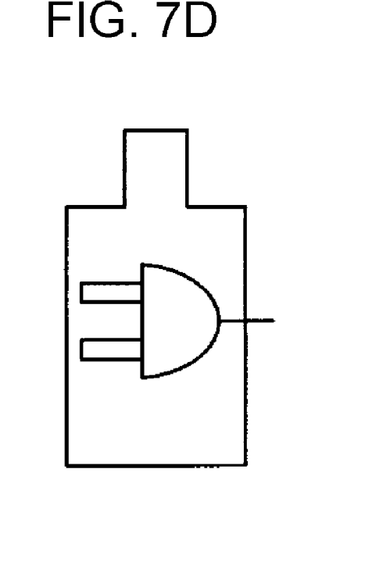
FIG. 7D is a diagram of an icon of a battery pack displayed on a display.

FIG. 7D shows an icon in the case where the electronic device 50 is operated by the power from the AC adapter 10 while the battery pack 20 is fully charged by the power from the AC adapter 10, for example, in the case where the genuine battery pack 20a is connected together with the AC adapter 10 and is fully charged or the third-party battery pack 20b is connected into full charge (first embodiment).

Thus, displaying such icons that show the state of the battery pack 20 on the display 31 or the like allows the amount of remaining power and the charging state of the battery pack 20 to be grasped, and further facilitates grasping whether the battery pack 20 connected to the electronic device 50 is out of order or may the copy or imitation battery pack 20c.

As another embodiment, in addition to the first and second embodiments, the history of the connection of the battery pack 20 to the electronic device 50 may be stored in the nonvolatile memory 105 (FIG. 2) of the control circuit 100.

The inferior copy or imitation battery pack 20c sometimes imitates a genuine product so skillfully that cannot be discriminated in appearance from the genuine battery pack 20a. Therefore, the user often mistakes it for the genuine battery pack 20a. Thus, when an accident occurs because of the rupture of the inferior copy or imitation battery pack 20c that imitates a genuine product skillfully, the user may misunderstand it to be due to the genuine battery pack 20a. Accordingly, the manufacturer of the electronic device 50 may be burdened with unjust responsibility and lose business credibility. However, it is actually difficult to prove that the ruptured battery pack is not the genuine battery pack 20a but the copy or imitation battery pack 20c and to specify the manufacturer of the copy or imitation battery pack 20c.

Therefore, the history of the connection of the battery pack 20 to the electronic device 50 is stored in the nonvolatile memory 105 (see FIG. 2) of the control circuit 100. The information to be stored as the connection history of the battery pack 20 includes the date of connection of the battery pack 20, the authentication result of each connection, and a user input operation for the request to input whether the battery pack 20 used is the genuine battery pack 20a. In this way, the connection history of the battery pack 20 is stored in the nonvolatile memory 105. Accordingly, in the event of an accident such as the rupture of the battery pack 20, it may easily be proved that the ruptured battery pack 20 is not the genuine battery pack 20a by referring to the connection history of the battery pack 20 stored in the nonvolatile memory 105.

Figure 8:
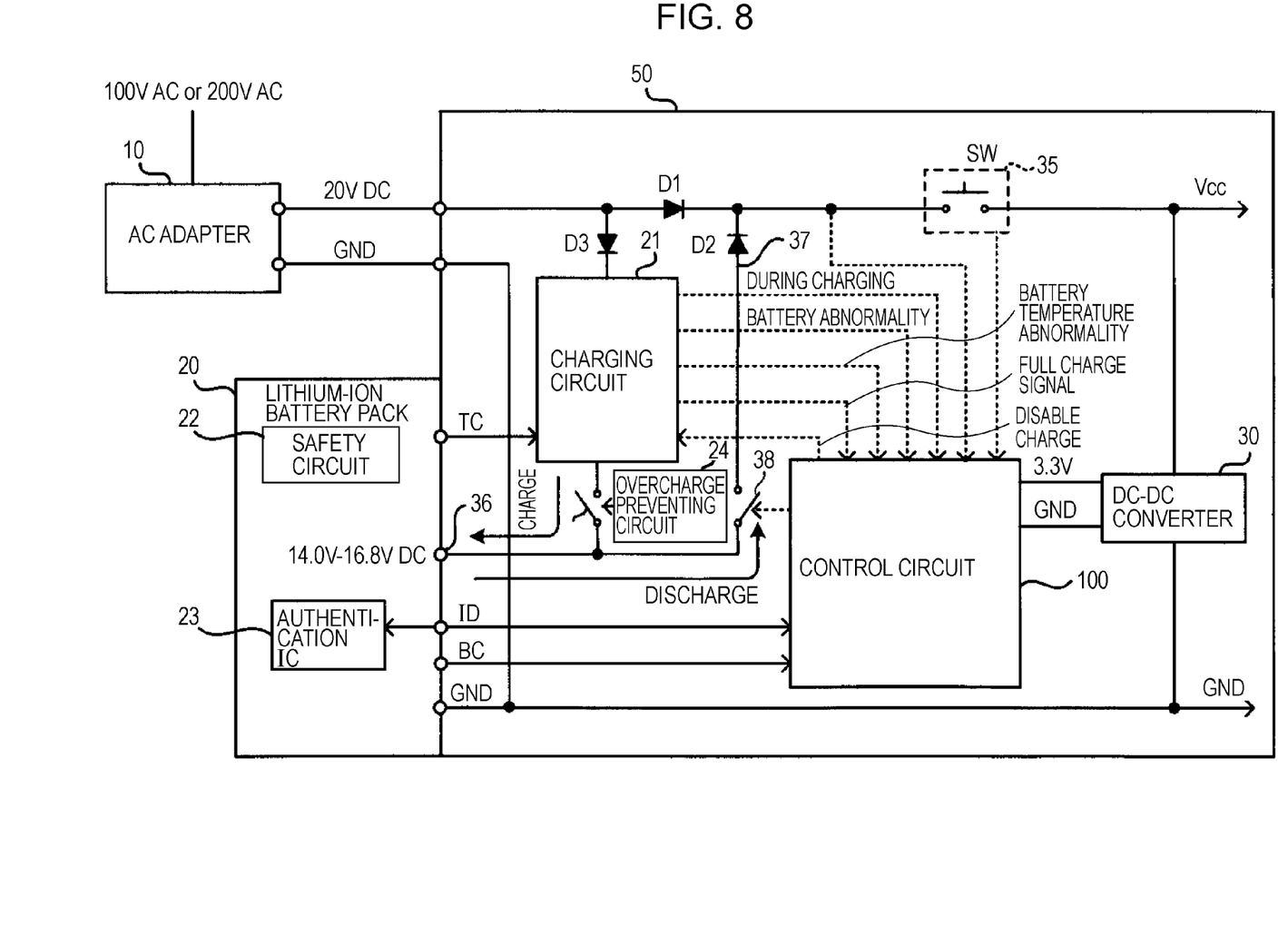
FIG. 8 is a diagram of another power circuit.

FIG. 8 shows another power circuit. FIG. 8 is the same as FIG. 2 except that it has a switch 38 in series in the middle of a power line 37 that connects the power line Vcc and a terminal 36 of the battery pack 20. To disable discharging in the foregoing embodiments, the switch 38 may be turned off. To disable charging, a switch 25 disposed in series in the middle of the line that branches from the middle of the power line 37 may be turned off.

It is to be understood that the invention is not limited to the foregoing embodiments and various modifications may be made within the scope of the claims of the invention, and that such modifications fall within the scope of the invention.

The entire disclosure of Japanese Patent Application Nos: 2006-067129, filed Mar. 13, 2006 and 2006-311423, filed Nov. 17, 2006 are expressly incorporated by reference herein.

What is claimed is:

1. An electronic device having a structure operable by the power of a battery pack, the electronic device comprising:
   an authenticating section disposed within a battery pack that authenticates the battery pack connected to the electronic device, where the battery pack supplies power to the authenticating section so that the authenticating section may determine whether the battery pack is a genuine product;
   a user interface; and
   a controller for controlling the electronic device;
   wherein the controller performs an authentication process with the authenticating section when the battery pack is connected to the electronic device so as to supply power to the electronic device, such that when the battery pack has been authenticated, the discharging of the battery pack is enabled, and such that when the battery pack has not been authenticated, the controller requests the user to input recognition through the user interface indicating whether the battery pack is a genuine product, and changes the control for the battery pack depending on the user input indicating that the battery pack is a genuine product or indicating that the battery pack is not a genuine product,
   wherein in response to the request, when the user inputs the recognition that the battery pack is a genuine product, the controller disables the discharging of the battery pack, and when the user inputs the recognition that the battery pack is not a genuine product, the controller enables the discharging of the battery pack.

2. An electronic device having a structure operable by the power of a battery pack, the electronic device comprising:
   an authenticating section disposed within a battery pack that authenticates the battery pack connected to the electronic device, where the battery pack supplies power to the authenticating section so that the authenticating section may determine whether the battery pack is a genuine product;

a user interface; and a controller for controlling the electronic device;

wherein the controller performs an authentication process with the authenticating section when the battery pack is connected to the electronic device so as to supply power to the electronic device, such that when the battery pack has been authenticated, the discharging of the battery pack is enabled, and such that when the battery pack has not been authenticated, the controller requests the user to input recognition through the user interface indicating whether the battery pack is a genuine product, and changes the control for the battery pack depending on the user input indicating that the battery pack is a genuine product or indicating that the battery pack is not a genuine product, wherein when the user inputs, in response to the request, the recognition that the battery pack is a genuine product, the controller determines that the battery pack is out of order, and thus notifies the user of the fact through the user interface and disables the discharging of the battery pack as long as the battery pack is connected so as to supply power.

3. The electronic device according to claim 1, wherein when the user inputs, in response to the request, the recognition that the battery pack is not a genuine product, the controller enables the discharging and controls the user interface so that the amount of remaining power of the battery pack is displayed lower than that of a genuine product.

4. The electronic device according to claim 3, wherein when the user inputs, in response to the request, the recognition that the battery pack is not a genuine product, the controller manages the amount of remaining power of the battery pack and displays the amount of remaining power of the battery pack on the user interface while setting the threshold in estimating the amount of remaining power on the basis of output voltage higher than that of a genuine battery pack as long as the battery pack is connected so as to supply power.

5. An electronic device having a structure operable by the power of a battery pack or the power of an external power source other than the battery pack, the electronic device comprising:

an authenticating section disposed within a battery pack that authenticates the battery pack connected to the electronic device, where the battery pack supplies power to the authenticating section so that the authenticating section may determine whether the battery pack is a genuine product;

a user interface;

a charging circuit that can charge the battery pack with the power supplied from the external power source; and a controller for controlling the electronic device;

wherein the controller performs an authentication process with the authenticating section when the battery pack is connected to the electronic device so as to supply power to the electronic device, such that when the battery pack has been authenticated, the charging and discharging of the battery pack are enabled, and such that when the battery pack has not been authenticated, the controller requests the user to input recognition through the user interface indicating whether the battery pack is a genuine product, and changes the control for the battery pack depending on the user input indicating that the battery pack is a genuine product or indicating that the battery pack is not a genuine product, wherein, in response to the request, when the user inputs the recognition that the battery pack is a genuine product, the controller disables the charging and the discharging of the battery pack, and when the user inputs the recognition that the battery pack is not a genuine product, the controller enables the discharging and disables the charging.

6. An electronic device having a structure operable by the power of a battery pack or the power of an external power source other than the battery pack, the electronic device comprising:

an authenticating section disposed within a battery pack that authenticates the battery pack connected to the electronic device, where the battery pack supplies power to the authenticating section so that the authenticating section may determine whether the battery pack is a genuine product;

a user interface;

a charging circuit that can charge the battery pack with the power supplied from the external power source; and a controller for controlling the electronic device;

wherein the controller performs an authentication process with the authenticating section when the battery pack is connected to the electronic device so as to supply power to the electronic device, such that when the battery pack has been authenticated, the charging and discharging of the battery pack are enabled, and such that when the battery pack has not been authenticated, the controller requests the user to input recognition through the user interface indicating whether the battery pack is a genuine product, and changes the control for the battery pack depending on the user input indicating that the battery pack is a genuine product or indicating that the battery pack is not a genuine product, wherein, when the user inputs, in response to the request, the recognition that the battery pack is a genuine product, the controller determines that the battery pack is out of order, and thus notifies the user of the fact through the user interface, and disables the charging and the discharging of the battery pack as long as the battery pack is connected so as to supply power.

7. The electronic device according to claim 5, wherein when the user inputs, in response to the request, the recognition that the battery pack is not a genuine product, the controller disables only the charging of the battery pack and notifies the user of the fact as long as the battery pack is connected so as to supply power.

8. The electronic device according to claim 5, wherein when the user inputs, in response to the request, the recognition that the battery pack is not a genuine product, the controller enables the discharging and controls the charging so that the battery pack is fully charged at a charge amount lower than that of a genuine product.

9. The electronic device according to claim 8, wherein when the user inputs, in response to the request, the recognition that the battery pack is not a genuine product, the controller sets the full-charging voltage when controlling the charging of the battery pack lower than the full-charging voltage of a genuine product as long as the battery pack is connected so as to supply power.

10. The electronic device according to claim 5, wherein when the user inputs, in response to the request, the recognition that the battery pack is not a genuine product, the controller enables the discharging and controls the user interface so that the amount of remaining power of the battery pack is displayed lower than that of a genuine product.

11. The electronic device according to claim 10, wherein when the user inputs, in response to the request, the recognition that the battery pack is not a genuine product, the controller manages the amount of remaining power of the battery pack and displays the amount of remaining power of the battery pack on the user interface while setting the threshold in estimating the amount of remaining power on the basis of output voltage higher than that of a genuine battery pack.

12. The electronic device according to claim 1, wherein when the power of the electronic device is turned on in a state in which the battery pack is connected so as to supply power and when it is detected that the battery pack is connected so as to supply power while the electronic device is at power-on, the controller tries authentication of the battery pack with the authenticating section.

13. A method for controlling an electronic device by computer software, the electronic device having a user interface and operable by the power of a battery pack, the method comprising:
  (a) trying authentication of a battery pack using an authentication section disposed within the battery pack when the battery pack is connected to the electronic device, where the battery pack supplies power to the authenticating section so that the authenticating section may determine whether the battery pack is a genuine product;
  (b) enabling the discharging of the battery pack when the battery pack has been authenticated in step (a); and
  (c) when the battery pack has not been authenticated, requesting the user to input recognition whether the battery pack is a genuine product through the user interface and changing the control for the battery pack depending on the user input indicating whether the battery pack is a genuine product or not a genuine product;
  wherein in response to the request, when the user inputs the recognition that the battery pack is a genuine product, a controller disables the discharging of the battery pack, and when the user inputs the recognition that the battery pack is not a genuine product, the controller enables the discharging of the battery pack.

14. A computer program product comprising a computable useable medium having computer readable program code embodied therein, the computer program product comprising computer readable program code devices configured to cause one or more computers to execute the method for controlling the electronic device according to claim 13.

* * * * *